United States Patent
Schramm et al.

[11] Patent Number: 5,884,719
[45] Date of Patent: Mar. 23, 1999

[54] METHOD AND APPARATUS FOR DRIVE SLIP CONTROL

[75] Inventors: Herbert Schramm, Leonberg; Andreas Ziegler, Weissach; Peter Kozel, Odelzhausen, all of Germany

[73] Assignee: Robert Bosch GmbH, Stuttgart, Germany

[21] Appl. No.: 748,475

[22] Filed: Nov. 8, 1996

[30] Foreign Application Priority Data

Dec. 23, 1995 [DE] Germany .................. 195 48 564.5

[51] Int. Cl.$^6$ .................................................. B60K 28/16
[52] U.S. Cl. .............................................. 180/197; 701/90
[58] Field of Search ............................ 180/197; 701/70, 701/82, 84, 85, 86, 90

[56] References Cited

U.S. PATENT DOCUMENTS

| | | | |
|---|---|---|---|
| 4,821,606 | 4/1989 | Leiber ................................. | 74/866 |
| 5,029,087 | 7/1991 | Cowan et al. .......................... | 701/90 |
| 5,085,301 | 2/1992 | Imamura et al. ....................... | 180/197 |
| 5,164,902 | 11/1992 | Kopper et al. ........................ | 364/426.02 |
| 5,313,391 | 5/1994 | Sigl et al. ............................ | 364/180 |
| 5,351,779 | 10/1994 | Yamashita ............................ | 180/197 |
| 5,588,937 | 12/1996 | Kono et al. ........................... | 477/169 |
| 5,732,376 | 3/1998 | Hrovat et al. ......................... | 701/90 |

FOREIGN PATENT DOCUMENTS

| | | |
|---|---|---|
| 0166178 | 5/1985 | European Pat. Off. . |
| 4103635 | 8/1992 | Germany . |
| 4429242 | 2/1995 | Germany . |
| 19501721 | 7/1995 | Germany . |
| 2188996 | 10/1987 | United Kingdom . |

*Primary Examiner*—Kevin Hurley
*Attorney, Agent, or Firm*—Fulbright & Jaworski, LLP

[57] ABSTRACT

When at least one drive wheel is showing a tendency to spin, at least the torque of the drive unit of the vehicle is influenced so as to reduce the tendency to spin. The tendency to spin is recognized when the slip of at least one of the drive wheels exceeds a predetermined desired value, where this desired value is adjustable as a function of at least one operating variable. This minimum of one operating variable is associated with the drive power called for by the driver, and is based on at least one of gas pedal position and engine rpm. The desired slip is increased in the range of higher power demands to improve the traction.

10 Claims, 3 Drawing Sheets

$V_{RAD\ VL} = V_{WHEEL\ FRONT\ LEFT}$
$V_{RAD\ VR} = V_{WHEEL\ FRONT\ RIGHT}$
$V_{RAD\ HL} = V_{WHEEL\ REAR\ LEFT}$
$V_{RAD\ HR} = V_{WHEEL\ REAR\ RIGHT}$

FP = GAS PEDAL
$n_{Mot} = n_{ENGINE}$
$V_{FZG} = V_{VEHICLE}$
FW = DRIVER'S COMMAND
SOLL = NOMINAL $V_{FZG} = V_{VEHICLE}$
FW0 = DRIVER'S COMMAND-0
FW1 = DRIVER'S COMMAND-1
FAHRERWUNSCH = DRIVER'S COMMAND

METHOD AND APPARATUS FOR DRIVE SLIP CONTROL

BACKGROUND OF THE INVENTION

The invention pertains to a method and to an apparatus for drive slip control wherein the engine torque is reduced when the actual slip exceeds a predetermined desired slip which is adjustable as a function of a measured operating variable.

In acceleration processes on roads with low coefficients of friction, the driver often applies too much gas, which causes the drive wheels to spin. In these cases, the drive slip control (ASR) adjusts the drive slip to a value calculated in the control unit. This slip determines the traction and the stability (steering stability) of the vehicle.

It is true for many road surfaces that high traction also requires a high desired slip, whereas good vehicle stability requires a low desired slip. The process of arriving at the desired slip value is therefore a compromise between the maximum achievable traction and the minimum acceptable stability.

To improve this situation, the desired slip is adjusted automatically to the velocity of the vehicle and to travel around curves. During straight-ahead travel, the desired slip is usually calculated by adding a velocity-independent value to a velocity-dependent value. In the normal case, these values are determined by driving tests in such a way that the relative desired slip (desired slip relative to the velocity of the vehicle) of the drive wheels decreases with increasing velocity, so that better vehicle stability is achieved at higher velocities. At lower velocities, the relative desired slip is high; it therefore gives greater traction in many cases.

An approach such as this is known from, for example, EP-A 166 178.

To guarantee the steering stability of the vehicle at low velocities even when traveling around a curve, the desired slip is usually reduced as a function of the velocity and a radius of curvature estimated from the wheel speeds. This approach is known from, for example, GB 2,188,996.

During fast or slow driving on mountain roads, the way in which the desired slip is calculated leads in many cases to a reduction in the engine torque by the drive slip control. As a result, the engine torque is no longer sufficient, and the vehicle slows down. In extreme cases, the vehicle can even come to a complete standstill.

U.S. Pat. No. 5,313,391 discloses a drive slip control system, in which the desired slip is calculated as a function of the vehicle's acceleration to achieve an improvement in the traction. In addition, the desired slip is corrected as a function of the square of the vehicle's velocity to equalize the tire tolerances, and the driver's influence on the determination of the slip threshold and thus on the coordination between traction and stability is also taken into account. This is accomplished by weighting the vehicle's acceleration and the square of the vehicle's velocity with the position of the gas pedal or the position of the throttle valve. Nevertheless, as the acceleration decreases and the velocity of the vehicle drops, the driver's influence decreases.

SUMMARY OF THE INVENTION

The object of the invention is to provide a determination of the desired slip so that greater traction is provided in the cases where the driver requires traction, such as mountain road driving and/or when the surface of the road is loose.

This is achieved by determining a driver's command based on at least one of gas pedal position and engine rpm's as the measured operating variable, determining the desired slip as a function of the driver's command, and increasing the desired slip with an increasing driver's command.

It is guaranteed that, even in extreme situations on mountain roads during interventions by the drive slip control, the engine torque will never be decreased to such an extent that the vehicle comes to a complete standstill or even slows down significantly.

It is especially advantageous that the desired slip is increased and thus priority given to traction in ranges where high torque is demanded of the engine, whereas the desired slip is changed to give priority to the stability of the vehicle in the other ranges.

A particular advantage is derived from the change in the desired slip as a function of the position of the gas pedal. That is, the desired slip is increased from a predetermined gas pedal position value up to a second predetermined value but remains essentially constant outside this range.

The dependence of the desired slip on the engine rpm's is also advantageous. In particular, the desired slip is reduced in rpm ranges with a descending torque characteristic, which thus gives priority to stability.

It is also advantageous to adjust the desired slip to the command which the driver uses to control a diesel engine, that is, to the desired amount of fuel. This value is read from a predetermined characteristic diagram in an electronic diesel control unit as a function of the position of the gas pedal and the engine rpm's. The dependence of the slip on the driver's command corresponds qualitatively to the dependence of the slip on the position of the gas pedal.

In an especially advantageous manner, this signal from the electronic diesel control unit is sent via a communications system (such as CAN) to the control unit for drive slip control.

DESCRIPTION OF THE EXEMPLARY EMBODIMENTS

Figure 1:
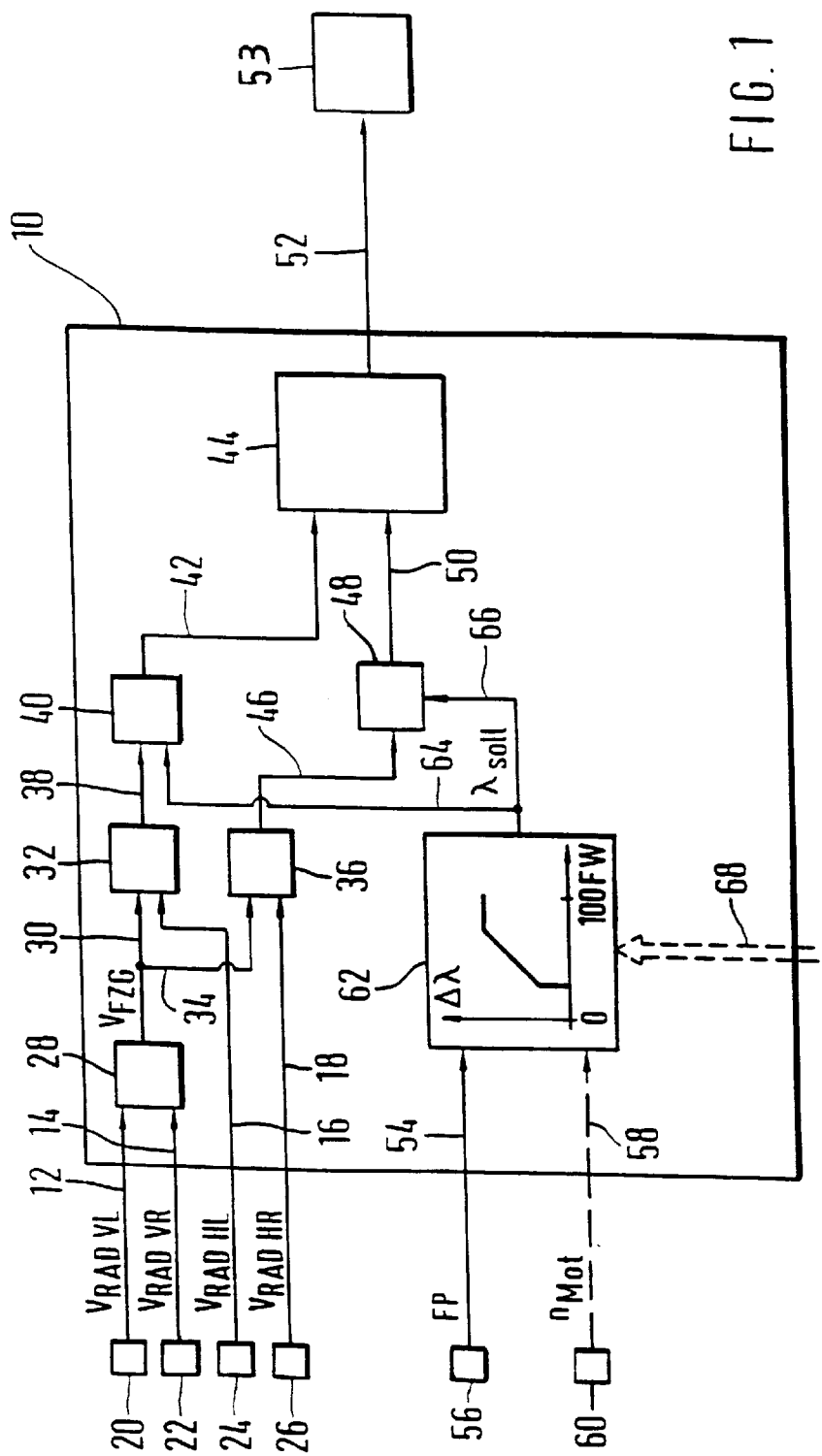
FIG. 1 is a block diagram of a drive slip control system.

On the basis of a general functional block diagram, FIG. 1 shows an example of drive slip control with a view to the solution according to the invention. Within the scope of this example, it is provided that, when the predetermined desired slip threshold is exceeded by at least one or by both drive wheels, at least the drive torque of the vehicle's engine is influenced in such a way as to reduce the drive slip. Various methods are known in the state of the art for implementing drive slip control, for determining the slip values of the drive wheels, and for influencing the engine torque when the drive slip at one or both drive wheels of one axle becomes unacceptable. Within the scope of a preferred exemplary embodiment, the approach shown in FIG. 1 is taken.

The speeds of the wheels ($V_{radvl}$, $V_{radhl}$, $V_{radvr}$, $V_{radhr}$) of a two-axle vehicle are sent to control unit 10 via input lines 12, 14, 16, and 18 from corresponding measuring devices 20, 22, 24, and 26. It is assumed here that the vehicle in question has rear-wheel drive. Input lines 12, 14, over which the wheel speeds $V_{radvl}$ and $V_{radvr}$ of the non-driven wheels of the vehicle are sent from measuring devices 20, 22, are connected in the drive slip controller to a reference value former 28. From the reference value former, a line 30 leads to a first comparator 32; and another line 34 leads to a second comparator 36. Input line 16, which transmits the wheel speed of the first driven wheel $V_{radhl}$, is connected to comparator 32. Input line 18, which transmits the wheel speed of the second driven wheel $V_{radhr}$, is connected to comparator 36. Output line 38 of comparator 32 leads to another comparator 40, the output line 42 of which leads to the actual drive slip controller 44 itself. Output line 46 of comparator 36 leads to a comparator 48, the output line 50 of which is connected to drive slip controller 44. Its output line 52, which is at the same time the output line of control unit 10, leads to vehicle engine 53 to influence the engine torque or to a control unit which influences the torque of the drive unit, such as an electronic diesel control (EDC). An input line 54, furthermore, from a measuring device 56 for detecting the position of the gas pedal and, in an advantageous elaboration, an input line 58 from a measuring device 60 for detecting the engine rpm's, are connected to control unit 10 as well. These input lines lead to a desired value former 62, the first output line 64 of which is connected to comparator 40, whereas the second output line 66 is connected to comparator 48. As an alternative to input lines 54, 58, control unit 10 can be connected by way of a communications system 68 (e.g., CAN) to the other control units, especially to the engine control unit. This communications system takes care of transmitting the operating variables to desired value former 62.

In the preferred exemplary embodiment, the speeds of the non-driven wheels are sent to reference value former 28, which calculates a reference velocity $V_{FZG}$ for the drive slip control by averaging the two wheel speed signal values. In comparators 32, 36, the speeds of the drive wheels are compared with the reference velocity which has been found to determine the actual drive slip at the drive wheels of the vehicle. The desired drive slip is determined in desired value former 62. In addition to other variables affecting the drive slip, desired value former 62 determines the desired slip of the drive slip control on the basis of the input variables, starting from a predetermined, fixed value; the desired slip thus determined is transmitted to comparators 40, 48. According to the invention, this desired slip is adjusted in accordance with the position of the gas pedal, the engine rpm's, or the driver's command derived from the position of the gas pedal and the engine rpm's. In comparators 40, 48, the desired values is compared with the current actual value, and an output signal is generated when the actual value exceeds the desired value by an excessive amount, that is, is by a certain tolerance value. Drive slip controller 44 receives this signal and forms an output signal for reducing the engine torque in accordance with a predetermined control strategy, such as PID, so that the actual slip approaches the desired slip. It can be provided here that the drive slip controller acts on the engine torque whenever there is unallowable drive slip at only one drive wheel or that it intervenes only when both comparators 40, 48 generate an output signal. It is advantageous for the torque to be reduced in accordance with the greater deviation; in certain advantageous exemplary embodiments or in certain operating situations, the action on the engine torque can also be taken in accordance with the smaller deviation.

In addition to the influence exerted on the drive torque when drive slip is present, it is provided that, when one of the drive wheels starts to spin, the brake belonging to this drive wheel is also actuated. This is not shown in FIG. 1 for reasons of clarity.

An electronic engine control unit is provided to adjust the engine torque. When used for commercial vehicles, this control unit is an electronic diesel control. Within the scope of this control system, a characteristic diagram is provided, which determines the driver's command value, that is, the desired torque or the desired amount of fuel for the drive engine, from the position of the gas pedal and the engine rpm's. In modern control systems, the individual control units are connected by a communications system such as CAN, over which the information and data are exchanged. The driver's command can thus be transmitted by the electronic diesel control to the drive slip control and evaluated there in suitable fashion.

If a loaded vehicle is driving on a surface with a high coefficient of friction (dry street, snow with a rough surface, construction sites, non-asphalted roads, etc.), the driver will obviously actuate the gas pedal more, whereas in the case of surfaces with low coefficients of friction (ice, packed snow) and an empty vehicle, the gas pedal will be actuated less. In the former case, the driver expects high traction, in the second case good vehicle stability. Therefore, the adjustment of the desired slip value is to be selected as a function of the position of the gas pedal in such a way that, the further the position of the gas pedal, the greater the desired slip.

To reduce the danger of coming to a standstill on a mountain road, it is necessary to increase the desired slip in the engine rpm range with high torque and thus to weight traction more than stability. In the upper rpm range, where a descending torque characteristic usually occurs, and in which the next-higher gear is usually selected, the weighting of traction relative to stability is shifted more in favor of stability. This means that, first, as the engine rpm's increase, the desired slip increases, and that it decreases again in the range of high rpm's as the torque characteristic falls.

A combination of the two variables "gas pedal position" and "engine rpm's" represents the driver's command referred to above. If this variable is used to adjust the desired slip, the dependence shown in FIG. 2 has been found suitable in an advantageous exemplary embodiment.

Figure 2:
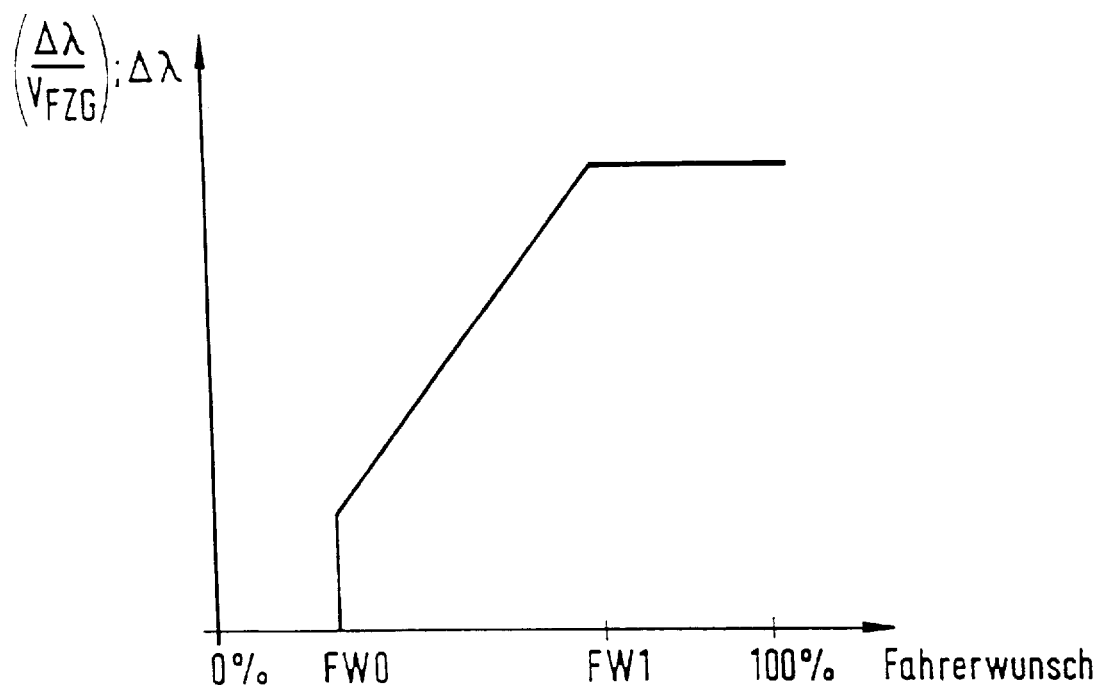
FIG. 2 is a plot of slip in dependence on the driver's command.

In FIG. 2, the increase in the desired slip is plotted on the vertical axis versus the driver's command. A similar picture is obtained when the slip increase relative to the vehicle velocity is plotted versus the driver's command. The driver's command changes from 0% (released gas pedal) to 100% (gas pedal pushed all the way down). It has been found that an essentially linear increase in slip in an intermediate range of driver's command values is suitable. Below a driver command $FW_0$, no increase in the desired slip is made with respect to the existing fixed value. Above this driver command value, a sudden increase occurs in the desired slip, which then rises in an essentially linear fashion with the driver's command until, at driver's command $FW_1$, the maximum value of the desired slip change is reached. From this value on until the complete actuation of the gas pedal, the desired slip increase remains essentially unchanged.

This has the advantageous result that, when the driver's command is in the intermediate range, the desired slip increases with the driver's command, so that the action taken on the engine torque is delayed; thus the traction of the vehicle is improved as the driver's command values increase. Conversely, in the direction toward smaller values of the driver's command, the vehicle stability is improved by the comparatively early point at which action is taken on the engine.

If the gas pedal position is used to adjust the desired slip, it is advantageous for the behavior to be comparable to that shown in FIG. 2. If, however, the engine rpm's are used, the value of the increase starts to drop back down to smaller values as soon as a certain maximum rpm value is reached, to which the point of maximum torque on the torque characteristic essentially corresponds.

In addition to the linear behavior of the increase in slip versus the driver's command, the gas pedal position, or the engine rpm's, it is also possible for other functions such as exponential or parabolic function curves to be used in other advantageous exemplary embodiments.

Figure 3:
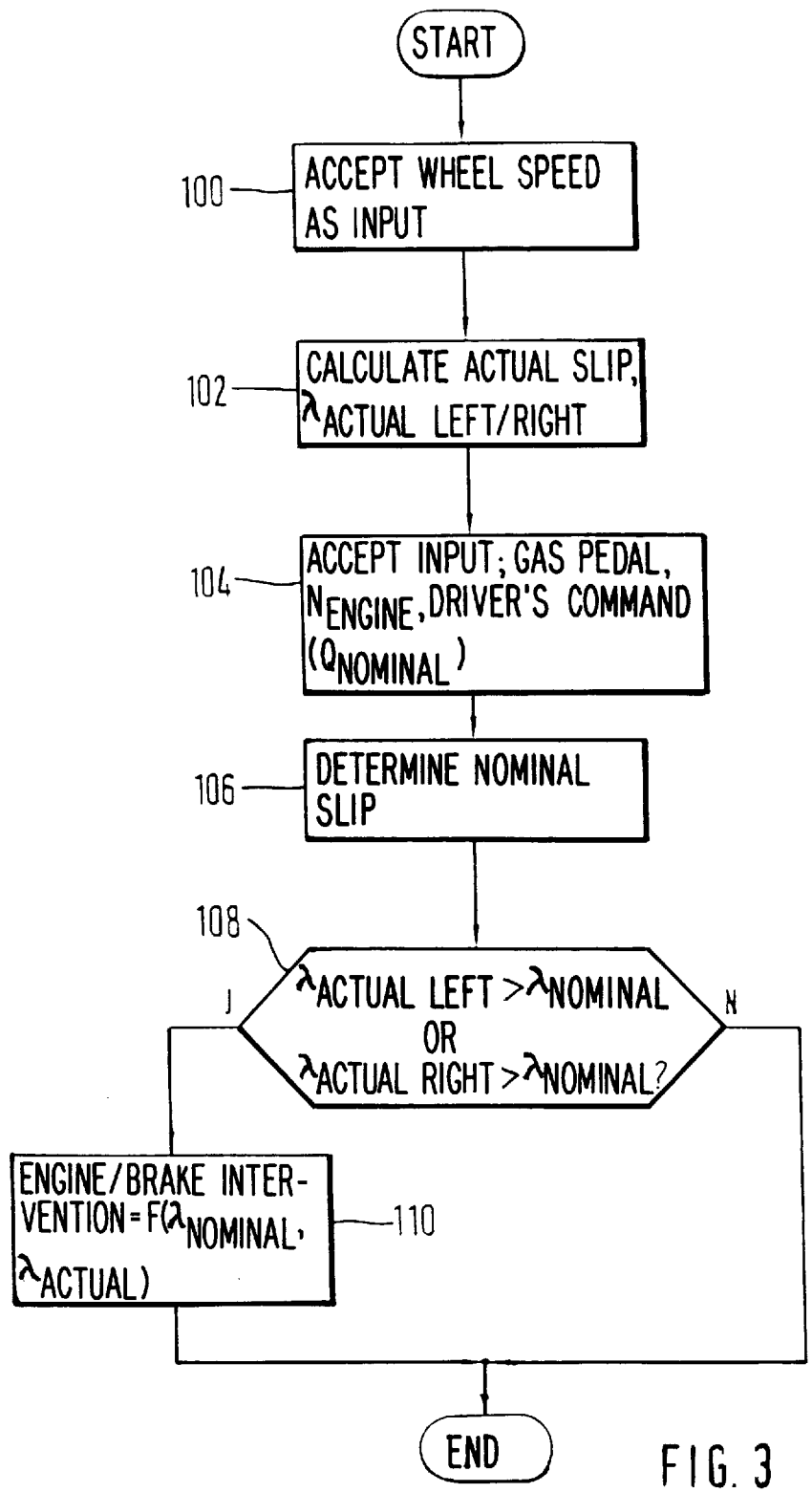
FIG. 3 is a flow diagram of the invention realized as a program running on a microcomputer.

FIG. 3 shows a flow chart, which describes the realization of the drive slip control within the scope of a computer program.

As soon as the subprogram starts at the predetermined time, the speeds of the driven and non-driven wheels are accepted as input in the first step 100, and the reference speed is calculated. Then, in step 102, the speeds of the drive wheels are compared with the reference speed to calculate the actual slip values $\lambda_{istL}$ and $\lambda_{istR}$. In the following step 104, values for the gas pedal position, the engine rpm's, and/or, via a CAN bus, the driver's command (desired torque, desired amount of fuel) are accepted as input. Then, in step 106, the desired slip value $\lambda_{soll}$ is determined. This is done in accordance with a fixed value, possibly additional operating variables, and the desired slip increase as a function of the driver's command, gas pedal position, and/or engine rpm's, as illustrated in FIG. 2 and described above. Following step 106, question step 108 is carried out, in which the actual slip values are compared with the desired slip. If, in the preferred exemplary embodiment, either the actual slip of the left or of the right wheel is greater than the given desired slip, the engine torque is reduced and possibly the associated wheel brake actuated in step 110 as a function of the deviation between the desired and actual values. In another exemplary embodiment, the engine intervention occurs only when drive slip occurs at both drive wheels, whereas the brake is actuated even if excessive drive slip has been recognized at only one drive wheel. After step 100 or after a negative answer in step 108, the subprogram ends and is repeated the next time it is needed.

We claim:

1. A method for reducing drive slip of a vehicle having an engine which develops torque in response to a driver's command, and drive wheels driven by said engine, said method comprising determining the actual slip of the drive wheels, determining at least one operating variable selected from the group consisting of gas pedal position, engine rpm and driver's command determined on the basis of at least one of gas pedal position and engine rpm, determining a desired slip value based on said operating variable, said desired slip value increasing with an increasing operating variable, comparing the actual slip of at least one of said drive wheels to said desired slip, and influencing at least one of the engine to reduce the drive torque and the brake when said actual slip of at least one of said driven wheels exceeds said desired slip value.

2. Method as in claim 1 wherein said desired slip value decreases with a decreasing driver's command.

3. Method as in claim 1 wherein said driver's command is based on engine rpm, said engine torque increasing with rpm to a maximum torque whereupon said torque decreases with rpm, said desired slip value increasing with rpm to said maximum torque value whereupon said desired slip value decreases with increasing rpm.

4. Method as in claim 1 wherein said driver's command is based on gas pedal position, said desired slip value increasing as a function of the gas pedal position.

5. A method for reducing drive slip of a vehicle having an engine which develops torque in response to a driver's command, and drive wheels driven by said engine, said method comprising determining the actual slip of the drive wheels, measuring at least one operating variable selected from the group consisting of gas pedal position and engine rpm, determining a driver's command based on said at least one operating variable, determining a desired slip value based on said driver's command, said desired slip value increasing with an increasing driver's command, comparing the actual slip of at least one of said drive wheels to said desired slip, and influencing the engine to reduce the drive torque when said actual slip of at least one of said driven wheels exceeds said desired slip value, wherein said driver's command comprises a lower range of values, an intermediate range of values, and a higher range of values, the desired slip value increasing linearly with the driver's command is in the intermediate range of values.

6. A method for reducing drive slip of a vehicle having an engine which develops torque in response to a driver's command, and drive wheels driven by said engine, said method comprising determining the actual slip of the drive wheels, measuring at least one operating variable selected from the group consisting of gas pedal position and engine rpm, determining a driver's command based on said at least one operating variable, determining a desired slip value based on said driver's command, said desired slip value increasing with an increasing driver's command, comparing the actual slip of at least one of said drive wheels to said desired slip, and influencing the engine to reduce the drive torque when said actual slip of at least one of said driven wheels exceeds said desired slip value, wherein said driver's command comprises a lower range of values, an intermediate range of values, and a higher range of values, the desired slip value remaining unchanged in the lower range of values.

7. Method as in claim 6 wherein a discontinuous increase in desired slip value occurs between said lower range and said intermediate range of slip values.

8. A method for reducing drive slip of a vehicle having an engine which develops torque in response to a driver's command, and drive wheels driven by said engine, said method comprising determining the actual slip of the drive wheels, measuring at least one operating variable selected from the group consisting of gas pedal position and engine rpm, determining a driver's command based on said at least one operating variable, determining a desired slip value based on said driver's command, said desired slip value increasing with an increasing driver's command, comparing the actual slip of at least one of said drive wheels to said desired slip, and influencing the engine to reduce the drive torque when said actual slip of at least one of said driven wheels exceeds said desired slip value, wherein said driver's command comprises a lower range of values, an intermediate range of values, and a higher range of values, the desired slip value remaining essentially unchanged in the upper range of values.

9. A method for reducing drive slip of a vehicle having an engine which develops torque in response to a driver's command, and drive wheels driven by said engine, said method comprising determining the actual slip of the drive wheels, measuring at least one operating variable selected from the group consisting of gas pedal position and engine rpm, determining a driver's command based on said at least one operating variable, determining a desired slip value based on said driver's command, said desired slip value increasing with an increasing driver's command, comparing the actual slip of at least one of said drive wheels to said desired slip, and influencing the engine to reduce the drive torque when said actual slip of at least one of said driven wheels exceeds said desired slip value, wherein said driver's command is determined in an electronic diesel control and transmitted via a communications system to a drive slip controller where said desired slip value is determined.

10. An apparatus for reducing drive slip of a vehicle having an engine which develops torque in response to a driver's command, and drive wheels driven by said engine, said method comprising means for determining the actual slip of the drive wheels, means for determining at least one operating variable selected from the group consisting of gas pedal position, engine rpm and driver's command determined on the basis of at least one of gas pedal position and engine rpm, means for determining a desired slip value based on said operating variable, said desired slip value increasing with an increasing operating variable, means for comparing the actual slip of at least one of said drive wheels to said desired slip, and means for influencing at least one of the engine to reduce the drive torque and the brake when said actual slip of at least one of said driven wheels exceeds said desired slip value.

\* \* \* \* \*